(12) United States Patent
Stultz et al.

(10) Patent No.: US 11,615,021 B2
(45) Date of Patent: Mar. 28, 2023

(54) CONFIGURABLE COMPUTER MEMORY

(71) Applicant: HEWLETT PACKARD ENTERPRISE DEVELOPMENT LP, Houston, TX (US)

(72) Inventors: Paul Dennis Stultz, Houston, TX (US); James T Bodner, Houston, TX (US); Kevin G Depew, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 418 days.

(21) Appl. No.: 16/426,722

(22) Filed: May 30, 2019

(65) Prior Publication Data

US 2019/0278708 A1    Sep. 12, 2019

Related U.S. Application Data

(63) Continuation of application No. 14/387,863, filed as application No. PCT/US2012/035910 on Apr. 30, 2012, now Pat. No. 10,339,051.

(51) Int. Cl.
| | |
|---|---|
| *G06F 12/06* | (2006.01) |
| *G06F 11/16* | (2006.01) |
| *G06F 9/445* | (2018.01) |
| *G06F 9/4401* | (2018.01) |
| *G06F 12/02* | (2006.01) |
| *G06F 11/20* | (2006.01) |

(52) U.S. Cl.
CPC ........ *G06F 12/0646* (2013.01); *G06F 9/4406* (2013.01); *G06F 9/44505* (2013.01); *G06F 11/1666* (2013.01); *G06F 12/0653* (2013.01); *G06F 11/20* (2013.01); *G06F 12/023* (2013.01); *G06F 2201/845* (2013.01); *G06F 2212/1016* (2013.01); *Y02D 10/00* (2018.01)

(58) Field of Classification Search
None
See application file for complete search history.

(56) References Cited

U.S. PATENT DOCUMENTS

| | | | |
|---|---|---|---|
| 6,938,127 | B2 | 8/2005 | Fletcher et al. |
| 7,206,970 | B1 | 4/2007 | Lauterbach et al. |
| 7,886,139 | B2 | 2/2011 | Hernandez et al. |
| 2002/0016891 | A1 | 2/2002 | Noel et al. |

(Continued)

FOREIGN PATENT DOCUMENTS

| | | |
|---|---|---|
| CA | 1081855 | 7/1980 |
| CN | 1997961 | 7/2007 |

(Continued)

OTHER PUBLICATIONS

Li et al., "Enabling Memory Reliability, Availability, and Serviceability Features on Dell PowerEdge Servers", (c) 2005 Dell Inc., p. 1-4.*

(Continued)

*Primary Examiner* — Brian R Peugh
(74) *Attorney, Agent, or Firm* — Dickinson Wright (57) ABSTRACT

A method for configuring a computer system memory, includes powering on the computer system; retrieving options for initializing the computer system; assigning to a first segment of the memory a first pre-defined setting; assigning to a second segment of the memory a second pre-defined setting; and booting the computer system.

23 Claims, 7 Drawing Sheets

(56) References Cited

U.S. PATENT DOCUMENTS

| | | | |
|---|---|---|---|
| 2004/0158828 A1 | 8/2004 | Zimmer et al. | |
| 2004/0267764 A1 | 12/2004 | Rothman et al. | |
| 2005/0066145 A1 | 3/2005 | Hyung et al. | |
| 2005/0257016 A1 | 11/2005 | Boles et al. | |
| 2007/0005998 A1 | 1/2007 | Jain | |
| 2010/0146180 A1 | 6/2010 | Takahashi et al. | |
| 2011/0066919 A1* | 3/2011 | Blankenship | G06F 11/1004 714/758 |
| 2011/0153908 A1 | 6/2011 | Schaefer et al. | |
| 2011/0154103 A1 | 6/2011 | Bulusu et al. | |

FOREIGN PATENT DOCUMENTS

| | | |
|---|---|---|
| CN | 101965570 | 2/2011 |
| CN | 102203735 | 9/2011 |

OTHER PUBLICATIONS

Dowler, M., "Beginners Guides: Overclocking the CPU, Motherboard & Memory," Sep. 8, 2006, 20 pages, http://www.pcstats.com/articleview.cfm?articleID=1804.

Dell, "Memory for Dell PowerEdge 12th Generation Servers," Feb. 2012, 16 pages, https://www.dell.com/downloads/global/products/pedge/poweredge_12th_generation_server_memory.pdf.

* cited by examiner

HEADER 0

BASE ADDRESS (QWORD)     0X00000000 0X00000000
LENGTH (QWORD)           0X00000004 0X00000000
CURRENT SETTING (BYTE)   0X01 (DEFINED IN ENTRY LIST)

NUMBER OR ENTRIES (BYTE) 0X04
ENTRY [0] – (0,0,0,100) //SDDC LOWEST RES, HIGHEST PERF
ENTRY [1] – (2,1,0,100) //DDDC MOD RES, MOD PERF
ENTRY [2] – (1,0,25,80) //SDDC + SPARE
ENTRY [3] – (3,2,50,80) //MIRROR

HEADER 1

BASE ADDRESS (QWORD)     0X00000004 0X00000001
LENGTH (QWORD)           0X00000008 0X00000000
CURRENT SETTING (BYTE)   0X02 (DEFINED IN ENTRY LIST)

NUMBER OF ENTRIES (BYTE) 0X03
ENTRY [0] – (2,1,0,100) //DDDC MOD RES, MOD PERF
ENTRY [1] – (1,0,25,80) //SDDC + SPARE
ENTRY [2] – (3,2,50,80) //MIRROR

HEADER 2

BASE ADDRESS (QWORD)     0X00000008 0X00000001
LENGTH (QWORD)           0X0000000C 0X00000000
CURRENT SETTING (BYTE)   0X00 (DEFINED IN ENTRY LIST)

NUMBER OF ENTRIES (BYTE) 0X01
ENTRY [0] – (1,0,25,80) //SDDC + SPARE

*FIG. 3*

```
SCOPE (\_SB.PCI0.ISA0) {
DEVICE(MM0) {
NAME (_HID, EISAID("PNP0M09")) // ID
}
// CURRENT RESOURCE DESCRIPTION
NAME(_CRS,
RESOURCETEMPLATE() {
IO(DECODE16,0XCA0,0XCA0,0,1)
IO(DECODE16,0XCA8,0XCA8,0,1)
})

// CREATE REGION AND FIELD
OPERATIONREGION(MM0, EMBEDDEDCONTROL, 0, 0XFF)
FIELD(MM0, BYTEACC, LOCK, PRESERVE) {
MODE, 16,// RAS POLICY
RS0, 16, // MEMORY RANGE 0 SETTING
RS1, 16, // MEMORY RANGE 1 SETTING
RAS, 16, // CURRENT POLICY
AL0, 16, // ADDRESS RANGE 0 BASE
AR0, 16 // ADDRESS RANGE 0 LENGTH
AL1, 16, // ADDRESS RANGE 1 BASE
AR1, 16, // ADDRESS RANGE 0 LENGTH
}

// RECEIVES AN SCI AND QUERIES
METHOD(_Q00) {
NOTIFY (\_SB.PCI0.ISA0.MM0.MZ0, 0X80)
} // END OF NOTIFY METHOD
```

FIG. 4

```
MEMORYZONE (MZ0) {
METHOD(_RAS) {RETURN (\_SB.PCI0.ISA0.MM0.RAS )} // GET CURRENT SETTINGS
NAME(_PSL, PACKAGE() {\_SB.MR0, \_SB.MR1}) // MEMORY DEVICE RANGES
METHOD(_RS0) {RETURN (\_SB.PCI0.ISA0.MM0.RS0)} // RESILIENCY SETTING 0
METHOD(_RS1) {RETURN (\_SB.PCI0.ISA0.MM0.RS1)} // RESILIENCY SETTING 1
METHOD(_AR0) {RETURN (\_SB.PCI0.ISA0.MM0.AR0)} // ADDRESS RANGE 0 BASE
METHOD(_AL0) {RETURN (\_SB.PCI0.ISA0.MM0.AL0)} // ADDRESS RANGE 0 LENGTH
METHOD(_AR1) {RETURN (\_SB.PCI0.ISA0.MM0.AR1)} // ADDRESS RANGE 1 BASE
METHOD(_AL1) {RETURN (\_SB.PCI0.ISA0.MM0.AL1)} // ADDRESS RANGE 1 LENGTH
METHOD(_SRS, 1) {STORE (ARG0, \_SB.PCI0.ISA0.MM0.MODE)} // SET RESILIENCY MODE
} // END OF MZ0

MEMORYZONE (MZ0) {
NAME(_MRS, PACKAGE() {
// PACKAGE DATA. A PACKAGE IS GENERATED FOR
// EACH PERMUTATION OF MEMORY RANGE OPTIONS.
// READ: TARGET, RESILIENCY SETTING, PERFORMANCE GRADE,
// MEMORY COST, RELATIVE PWR CONSUMED, 3 RESERVED
    PACKAGE () {\_SB.MR0, 0, 0, 0, 100, 0, 0, 0,},
    PACKAGE () {\_SB.MR0, 2, 1, 0, 100, 0, 0, 0,},
    PACKAGE () {\_SB.MR0, 1, 0, 25, 80, 0, 0, 0,},
    PACKAGE () {\_SB.MR0, 3, 2, 50, 80, 0, 0, 0,},
    PACKAGE () {\_SB.MR1, 0, 0, 0, 100, 0, 0, 0,},
}} // END OF MRS
} // END OF MZ0
} // END OF MM0
```

CONFIGURABLE COMPUTER MEMORY

CROSS-REFERENCE TO RELATED APPLICATION

This application is a continuation of U.S. patent application Ser. No. 15/387,863, which was filed on Sep. 25, 2014 and is hereby incorporated by reference in its entirety for all purposes.

BACKGROUND

Computer memories employ various features to enhance, on the one hand, performance, and on the other hand, resiliency or reliability. Features that serve to increase performance may decrease resiliency of reliability, and vice versa. A computer may not have the internal programming to make changes in these performance and resiliency features. For example, the computers basic operating system may not be programmed to make modifications to performance and resiliency features to account for changes in the computers operating conditions, or the requirements of applications executing on the computer.

DESCRIPTION OF THE DRAWINGS

The detailed description refers to the following drawings in which like numbers refer to like items, and in which.

DETAILED DESCRIPTION

Operation of a computer and its installed memory may be enhanced to increase performance on the one hand, or resiliency on the other. Increasing resiliency may decrease performance because increasing resiliency typically requires reservation of memory to support the desired increased resiliency. Furthermore, under some situations, increased performance may be preferable to increased resiliency while in other situations the opposite is true. The flexibility, granularity, and complexity of current memory resiliency features such as DRAM device recovery, sparing, mirroring, and lockstep have created scenarios where configuring computer systems for optimal or user- and application-desired reliability and power/performance is complex, difficult, and time consuming. Tradeoffs in reliability and performance, due either to impacts in total memory or bandwidth, may lead computer users to ignore potential memory configuration options. This situation may be exacerbated in current computer systems because the current computer systems may include options to configure memory at individual processing nodes or memory channels, but there are no methods for communicating memory resiliency settings and capabilities, beyond hot-plugging, to the computer's operating system, and for allowing operating system control of these settings for specified ranges of the memory. Without such a capability, it is unlikely that optimal performance and resiliency settings may be achieved.

Disclosed herein are systems and methods that allow a computer user to establish performance and resiliency goals, communicate the goals to the computer's operating environment, and let the operating system adjust the implementation of the goals to suit the specific operating conditions of the computer as those conditions change. Furthermore, the methods and systems, in an embodiment, allow the operating system to make "intelligent" memory configuration choices without any specific user input.

When a user or application issues a boot command to a computer, the computers CPU responds by attempting to retrieve operating system files from the computer system's hard drive. The CPU also attempts to retrieve configuration data files, from BIOS (basic input output system), to configure the computer parameters necessary for the specific hardware configuration. Following this boot process, the operating system has an opportunity to reconfigure the computers main memory. Thus, the herein disclosed systems and methods take advantage of a computer's normal boot operation to allow the computer's operating system to reconfigure computer memory performance and resiliency features to suit specific performance and resiliency goals established by the computers user. Note, however, that these goals may include default values.

The disclosed systems and methods communicate, through a data structure and a communications interface, the resiliency and performance settings and capabilities of computer memory segments, based, for example, on address ranges, to the computer's operating system so that the operating system may intelligently manage and allocate memory resources. This allows the operating system to allocate, for example, the most resilient memory regions to the most critical data/code/applications and the highest performance memory regions to the most performance sensitive data/code/applications. A user may identify these data/code/applications. Alternately or in addition, the operating system may identify the most important data/code/systems from the perspectives of performance and resiliency. For example, the operating system may identify the operating system kernel as the most important from the perspective of resilience, and may attempt to assign a mirrored memory segment to the kernel. Thus, the allocation and management of memory resources can be customized for specific use environments and applications. The disclosed systems and methods enable the operating system to set memory region configurations, based on information provided in the data structure, that would take effect on a subsequent reboot. Alternatively, the memory region configurations may be made without rebooting the operating system.

In an alternative; when a reboot is required to implement the memory reconfiguration, the computer user is presented with an alert, issued in a pop-up window, for example, that a reboot is required. The alert may state that the reboot will occur automatically, or may give the user an option to accept the reboot, or decline the reboot (and the memory reconfiguration). Alternately, the reboot may occur without warning. Finally, the user may be presented with a summation of the memory reconfiguration, or the memory configuration may be saved in a file in memory that is accessible to the user.

In operation, the computer's boot system firmware initializes and evaluates memory configurations with supported and available memory features for reliability, performance and power management. The firmware provides data structures during system boot that communicate memory capabilities/resiliency, trade-offs, and attributes for individual memory regions that allow for operating system evaluation of each defined memory range or segment, enabling intelligent allocation of memory resources by the operating system. For example, the data structures may tell the operating system that memory region 2 (out of four) is configured for mirroring, and thus half of memory region 2 will be used for the mirroring. The data structures may be exposed to the operating system at boot via a defined interface. The data structures may indicate both the current capability of each memory region as well as supported capabilities of each memory region. The operating system then may reconfigure memory regions to change current capabilities to any capabilities within the range of the defined supported capabilities.

In an embodiment, the operating system reconfigures a memory segment to support data/code/applications assigned to the memory segment. In another embodiment, the operating system assigns data/code/applications to memory segments based on the current configurations of the memory segments. In either embodiment, if a memory segment configuration is not ideal or suitable for specific data/code/applications, the operating system may reconfigure the memory segment.

Figure 1:
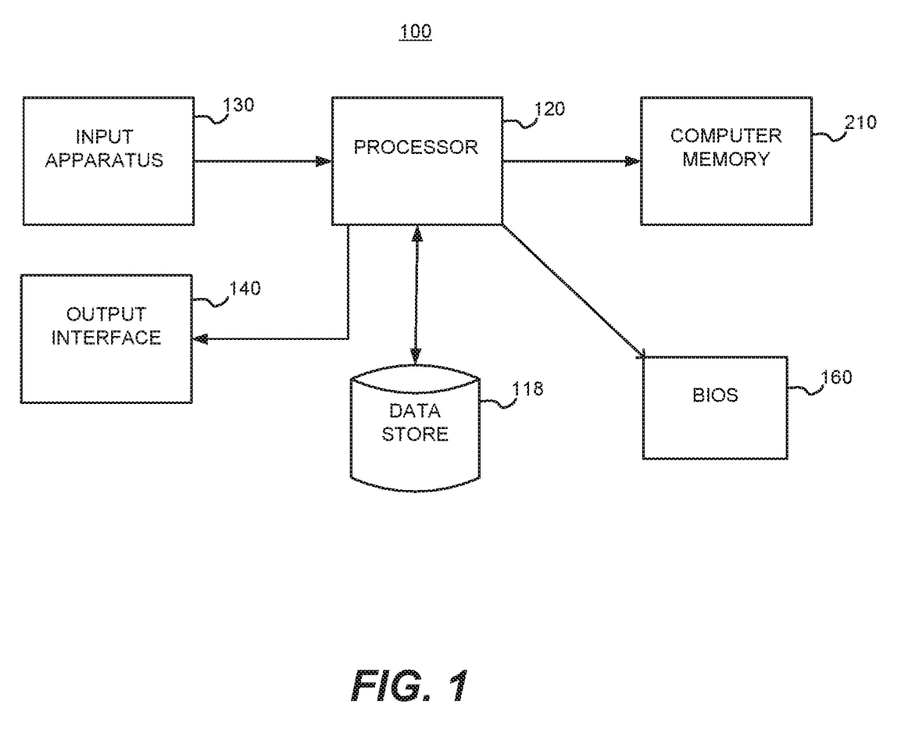
FIG. 1 illustrates an embodiment of a computer system that supports a configurable computer memory.

FIG. 1 illustrates a block diagram of an embodiment of a computer system that incorporates a configurable memory. In FIG. 1, computer system 100 includes processor 120; input apparatus 130, output interface 140, and data store 118. The processor 120 executes machine instructions that are loaded into computer main memory 210.

The processor 120 receives inputs from the input apparatus 130. The input apparatus 130 may include, for example, a user interface through which a user may access data, such as, objects, software, and applications that are stored in the data store 118, and may access versions of the data stored in the data store 118, as outputted through the output interface 140. In addition, or alternatively, a user may interface with the input apparatus 130 to supply data info and/or update previously stored data in the data store 118.

The computer system 100 includes basic input/output system (BIOS) 160. The BIOS 160 may be implemented as non-volatile memory such as a flash memory, EEPROM and memristor, for example. Firmware may be provided as part of the BIOS 160. If the computer system 100 is rebooted or restarted, initialization instructions that are stored as firmware in the BIOS 160 allow for a uniform initial operation, or startup and initial configuration of the computer system 100. The BIOS 160 may be operated and reconfigured based on system and user preferences. Further, a default setting may be programmed and incorporated into BIOS 160.

Figure 2:
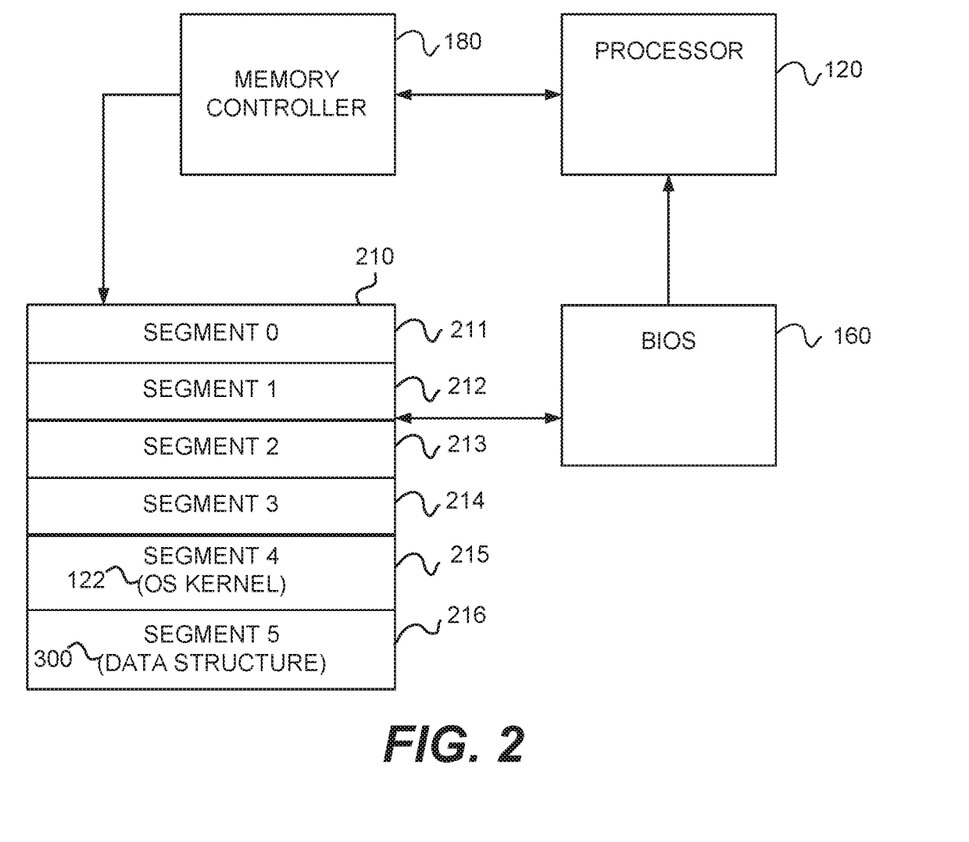
FIG. 2 is a schematic representation of elements of a configurable computer memory example.

FIG. 2 illustrates an example of a configurable computer memory and related components. In FIG. 2, computer main memory 210, which is shown connected to BIOS 160 and memory controller 180, includes four memory regions or segments, namely segments 211-214, which may be used for applications, segment 215, which holds the operating system kernel 122, and segment 216, which holds data structure 300. The memory 210 may be dynamic random access memory (DRAM) for example The BIOS 160 builds structure 300, which contains the current and potential setting of each of the memory segments 211-216 with respect to resiliency, performance, and power consumption, for example. As noted, the data structure 300 may be stored in the memory 210. The BIOS 160 communicates with the computer system's processed 120, and provides, for example, the information contained in the data structure 300. The processor 120 executes according to the computer's operating system, which includes an operating system kernel 122. The kernel 122 contains the core instructions for operating the computer system 100. The processor 120 communicates with the memory controller 180, which ultimately issues reconfiguration instructions to the memory segments 211-216.

As the computer system 100 is turned on, the BIOS 160 executes a system boot (or reboot). The BIOS 160 determines the capabilities of various portions of the memory 210, which may have been set based on a pre-defined setting. Thus, a first segment of memory 210 may have a reliability setting of X, and a second segment of memory 210 may have a reliability setting of Y, where X and Y are pre-defined settings. Alternatively, the settings may be set previously based on an optimization from detected data processed by either the BIOS 160, the operating system, or an application.

The settings may be based on a resiliency, accessibility, serviceability (RAS) standard. Thus, in the memory 210, each memory segment may be configured according to a specific implementation of the RAS standard based on what a user, operating system, or application determines is optimal. In an example, a user may designate application A as of utmost importance from a resiliency perspective and application B as of utmost importance from a performance perspective. In this example, the system firmware of the BIOS 160 defines performance, resiliency, and power consumption features that are available and currently invoked for each memory segment 211-216, and communicates these features to the operating system 170. The operating system 170 determines which applications should be mapped to which memory segment, and which, if any memory segments should be reconfigured as part of the mapping. The operating system 170 provides appropriate instruction to the memory controller 180, which implements the memory configuration determined by the operating system 170.

As noted above, the operating system 170 may make the configuration decisions based on its own internal logic, and without any (human) user input: for example, mirroring the operating system kernel. Alternately, the operating system 170 may be receive information from an associated application that lead the operating system of configure certain memory segments in a specific manner.

As shown in FIG. 2, memory 210 has several distinct segments 211-216. Segment 211 currently may be configured to optimize power consumption, so an appropriate RAS setting may apply to segment 211. Segment 212 may be optimized for reliability, and an appropriate RAS setting may be chosen for segment 212. In an example where segment 212 is categorized for reliability, a mirroring option may be available and assigned to segment 212. Thus, if mirroring is applied to segment 212, one half of the available memory in segment 212 is reserved to support mirroring, and consequently, applications requiring high performance may not perform as well with this memory segment as with another memory segment that is configured for optimum performance.

Figure 3:
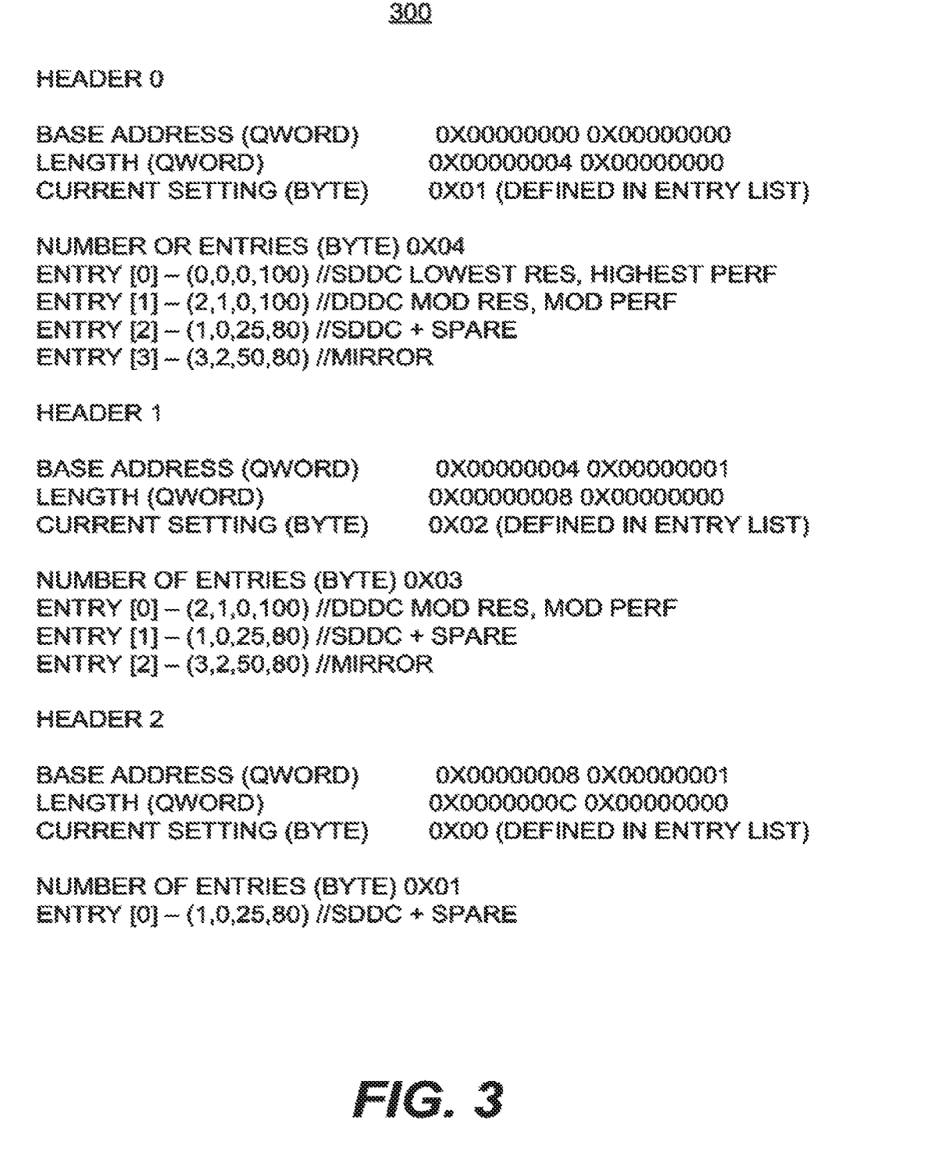
FIG. 3 is an example of a data structure that enables configuration of the computer memory of FIG. 2.

FIG. 3 shows an example data structure 300 constructed by the computer system's firmware to communicate to the operating system what are the memory capabilities of the memory segments. The code provided is an implementation specific to the Advanced Configuration and Power interface (ACPI) standards. However, the data structure 300 illustrated in FIG. 3 may be implemented with various coding languages and techniques, and thus, is not limited to the example shown in FIG. 3.

In FIG. 3, the data structure 300 refers to various resiliency features and performance features that may be used by a computer memory. The resiliency features include double device data correction (DDDC), which provides self-correction of up to two dynamic random-access memory (DRAW) errors and recovery from otherwise fatal system errors; single device data correction (SDDC), which provides self-correction for one DRAM error, mirroring, which replicates data, and sparing, which sets aside or reserves memory. Other resiliency features could be defined in the data structure 300.

By using the data structure 300 of FIG. 3 (as explained below), the operating system may determine an optimal usage of various memory segments. For example, if the operating system is "informed" or "determines" that an application or a portion of data is of the utmost importance, the operating system may reconfigure the memory segments so that the memory segment associated with that application of portion of the data has the highest possible reliability (for example, by mirroring). However, if the operating system 170 determines a data portion is less important, and is more concerned with performance, the operating system may reconfigure the memory segment to be optimized for performance. Similar decisions may be made for power management.

In FIG. 3, the data structure 300 includes three memory regions, or segments, each defined, for example, by a starting address and a length. For each defined memory region, the data structure 300 may indicate the current setting for that region with respect to resiliency, performance, memory use, power consumption, and other features. These values then are read by the computers operating system, which may reconfigure the memory regions (in an example, on reboot) to accommodate operation of the computer system and execution of applications.

As can be seen in FIG. 3, a first memory segment, indicated by header 0, has a defined base address and ending address as indicated by the length. The first memory segment also has a stated current setting, 01, which may be interpreted by reference to the four available entries [0]-[4]. Finally, the entries (in the entry list) define the available capabilities of the first memory segment. For example, the first memory segment is available to be configured for mirroring (entry [3]), but is currently configured for DDDC, according to entry [1], Note that entry [0] is (0, 0, 0, 100)//SDDC, which has the lowest resiliency value but the highest performance. The first "0" refers to the resiliency level—SDDC in this case; the second "0" refers to performance, and a lower number means higher performance; the third "0" refers to the percentage of the memory region set aside for resiliency—the memory "cost" (zero in the case of SDDC); and the "100" refers to the relative power consumption, which in this case is the maximum. Thus, entry [3], which as noted above, is available for configuring the first memory segment results in the highest resiliency level, with 50 percent of the memory segment set aside to support mirroring and an 80 percent relative power consumption.

The second memory segment is currently set for mirroring (entry [2]), but may be set for DDDC or SDDC+spare. The third memory region is set for SDDC+spare, and no other settings are available.

Assuming the memory 210 is 68 GB, with 48 GB addressable to the operating system as usable memory (a typical situation), memory range 0 (0-16 GB) currently is set to DDDC, memory range 1 (16-32 GB) currently is set to mirroring, and memory range 2 (32-48 GB) currently is set to SDDC+spare. The performance of the memory segments will differ, with the memory segment corresponding to range 2 (SDDC+spare) having the highest performance (and lowest resiliency) and the memory segment corresponding to range 1 (mirroring) having the lowest performance (and highest resiliency).

The above example data structure 300 provides the information necessary for the operating system to make intelligent decisions on the use of memory regions. As noted above, boot system; firmware provides the data structure 300 to list the current and available configurations for each memory region. By reading the current setting and the "Values" for each entry, the operating system "understands" the relative performance and resiliency of each memory region, and how that memory region may be reconfigured. The data structure 300 allows the operating system to allocate the most resilient memory regions to the most critical code/data/applications (such as the operating system kernel), and allows the operating system to allocate the highest performance memory regions to the most performance sensitive code/data/application. These elements of the entry are intended to be used to enable the operating system, either automatically or via user intervention, to make intelligent decisions on how to reconfigure memory regions, with the reconfiguration taking effect on the next system reboot.

Figure 4:
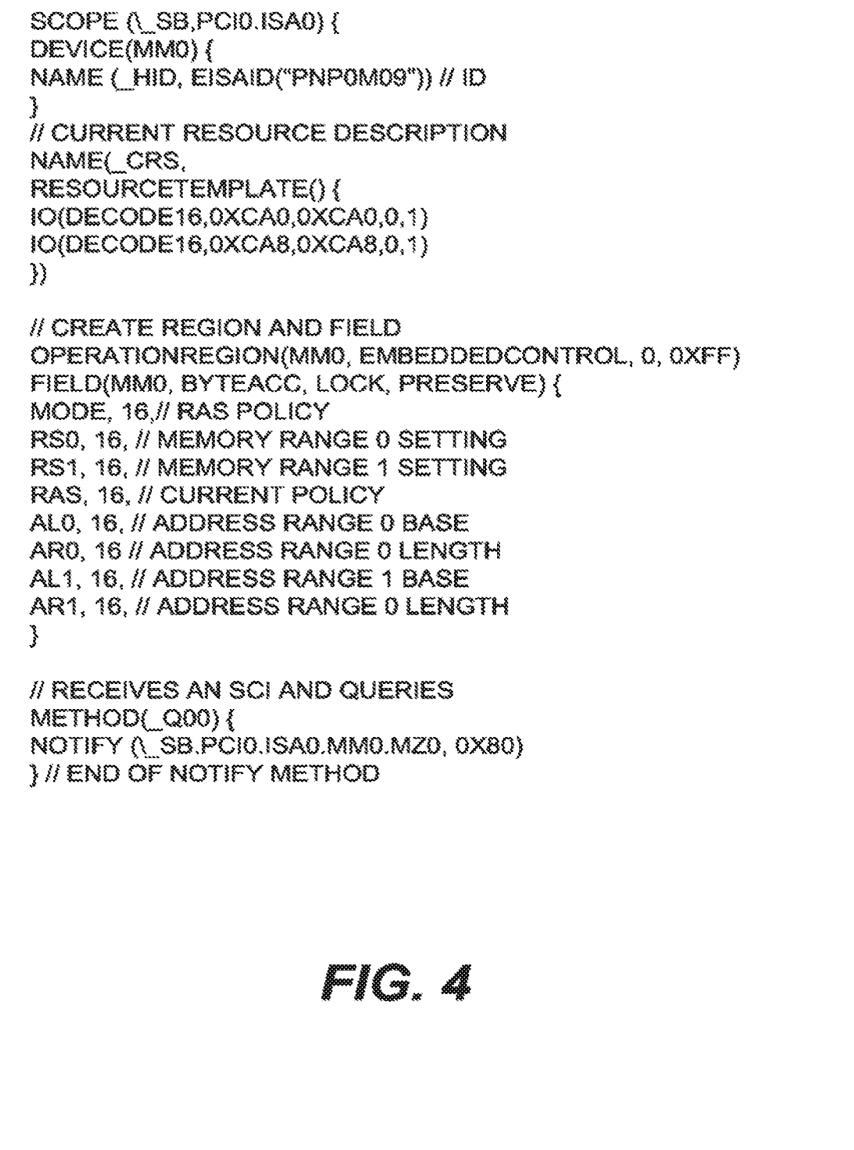
FIG. 4 is an example of instructions to an operating system to read a computer memory configuration.

Advanced Configuration and Power Interface (ACPI) methods allow the BIOS 160 firmware to communicate with the operating system to expose the operating system to the configurations and capabilities of the memory segments. FIG. 4 illustrates an example of ACPI-based method that may communicate the settings and capabilities of memory 210 to the operating system.

Figure 5:
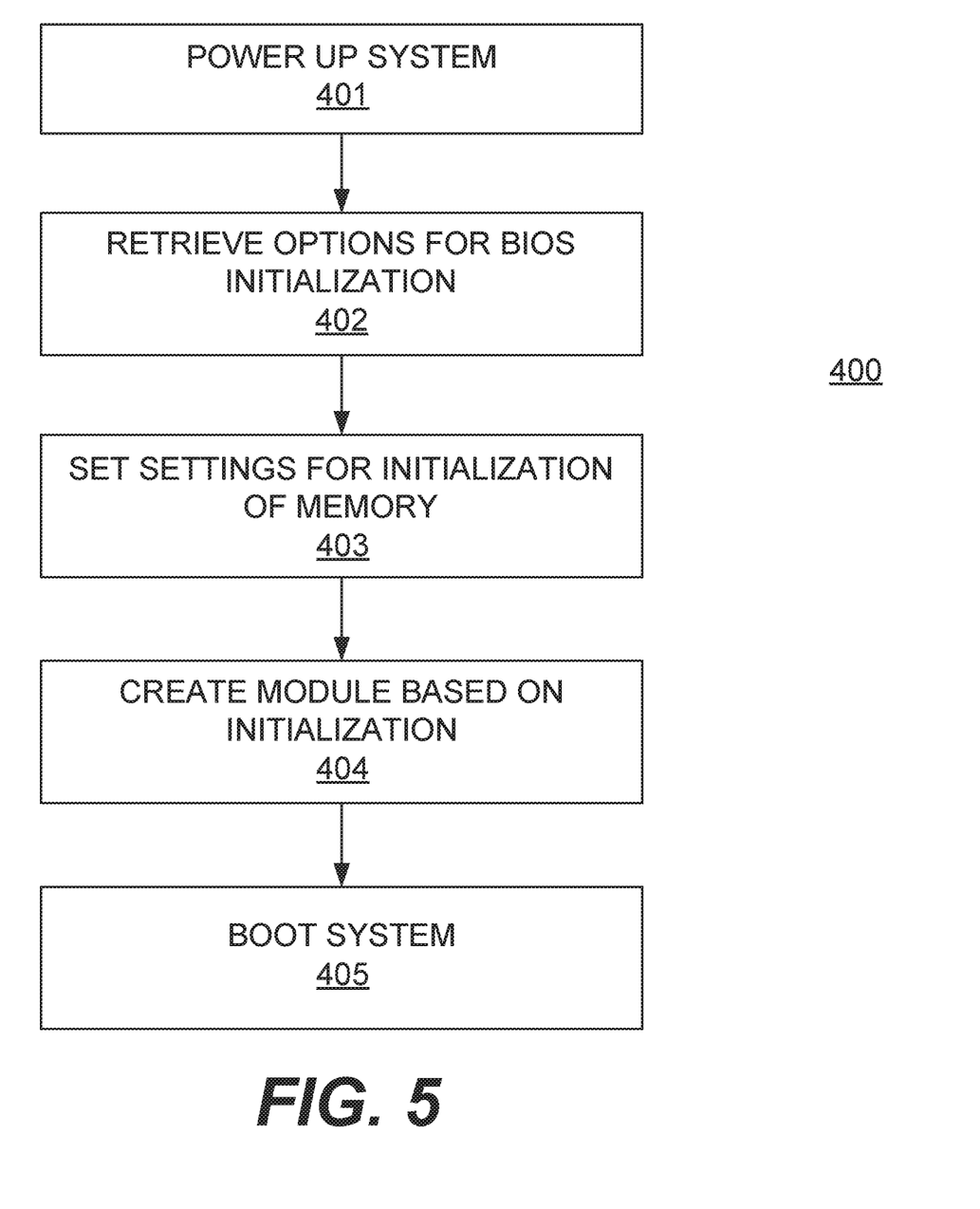
FIGS. 5 and 6 are examples of methods for configuring the computer memory of FIG. 2.

FIG. 5 is a flowchart of an example method for configuring a computer memory. In FIG. 5, block 401, a computer system 100 is either powered on or rebooted. A user, operating system, or other system may assert a switch, or issue a command, instructing the computer system 100 to power on or reboot.

At block 402, the computer system 100 accesses BIOS 160, and retrieves options for initializing the computer system 100. According to aspects disclosed herein, an option to change various segments of memory 210 based on a RAS or other settings may be presented. At block 403, the BIOS 160 firmware initializes the memory 210.

At block 404, the firmware creates data structure 300 based on the initialized memory 210 and the predetermined or current assignment of RAS settings for each segment of the memory 210. Thus, for example, segments 211-216 may each have an individually determined setting. The BIOS then provides a communication to provide the contents of the data structure to the operating system 170, upon boot up of the operating system.

At block 405, the computer system 100 boots into an operation mode. In the operation mode, if an application accesses the memory 210, the application may be directed to the segment of the memory 210 applicable to its operation based on the created data structure 300.

For example, the computer system 100 may be configured to support several virtual machines (VMs), which are managed by a virtual machine manager (VMM), which is part of the computers operating system. If the operating system is prompted to execute a VM, the operating system, based on the initialized memory 210, may make a decision to store the VM in a segment of memory 210 that has been initialized with redundancy, such as a mirrored segment. Thus, if segment 212 is associated with a mirrored configuration, the operating system may determine that segment 212 is ideal for using in conjunction with VM.

In another example, if the operating system is prompted to execute an e-mail program in the background, the operating system may determine that an email program in the background is static and does not update frequently. Thus, based on this, the operating system may determine to operate the email program on a segment of memory not optimized for performance.

In the examples provided above, the operating system is provided a choice to intelligently use various segments of memory based on an initialized RAS setting. Thus, memory may be more robustly and efficiently used.

Figure 6:
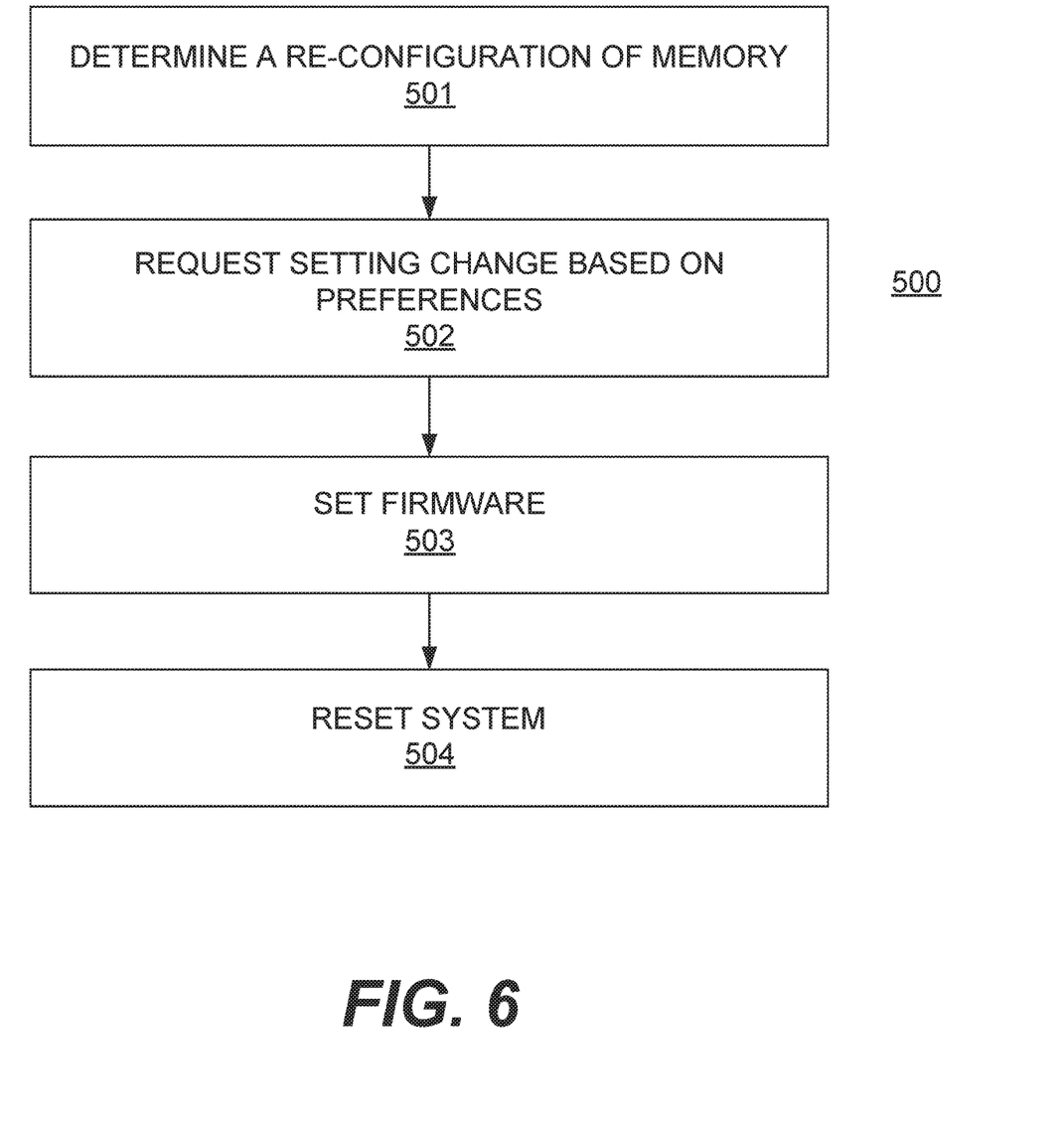

FIG. 6 illustrates a flowchart of an example method for dynamically changing the compartmentalization of memory according to an embodiment. In FIG. 6, method 500 begins at block 501, when a user or an application determines that a current memory state is not optimal or desired for a certain application. For example, memory 210 is 6 terabytes, segmented into six segments 211-216 of 1 terabyte each, and each is assigned to various RAS settings. If a determination is made that a particular application (such as VMware), requires a memory segment of a certain type of RAS currently not available, a user or application may determine that an adjustment to the configuration regime is desired.

At block 502, the user or the application issues a request to change the configuration of the memory 210. This may be done through various user interfaces: such as a setting application associated with the operating system, or a user interface to modify the settings of the memory.

At block 503, BIOS 160 firmware may receive and validate the request. After block 503, the BIOS 160 may be updated with initialization settings for reconfiguring the memory 210.

At block 504, the computer system 100 may be rebooted. Once a reboot occurs, the operations and methods at method 400, block 401 are executed, resulting in a re-configuration of the memory 210.

As disclosed above, the memory 210, and in particular, memory segments 211-216 may be configured by the operating system 170 based on available configurations determined by the BIOS 160 firmware. However, other components of the computer system 100 may determine and expose the memory configurations. In addition, the operating system, or another application may make the "intelligent" decision to reconfigure one or more of the memory segments 211-216. This "intelligent" decision may he based on pre-determined rules or standards available to the operating system or an application. In one example, if a portion of the computer system memory 210 fails such that mirroring no longer is possible, the operating system may direct the reconfiguration of the memory 210. The operating system, in this example, knows the most recent configuration of the memory segments, and what their available configurations are, and can direct the memory controller 180 to reconfigure accordingly. The actual reconfiguration may be established on computer system reboot.

What is claimed is:

1. A method comprising:
powering on a computer system associated with a memory;
in a pre-operating system environment of the computer system:
generating a data structure representing a plurality of available configurations for a first segment of the memory, wherein the first segment is defined by a first starting address and a first length, and generating the data structure comprises:
providing a first entry in the data structure corresponding to a first available configuration of the plurality of available configurations and comprising data representing a first reliability associated with the first available configuration; and
providing a second entry in the data structure corresponding to a second available configuration of the plurality of available configurations and comprising data representing a second reliability associated with the second available configuration, wherein the second reliability is greater than the first reliability;
and
booting an operating system of the computer system, wherein the booting comprises communicating the data structure to the operating system.

2. The method according to claim 1, wherein the first reliability and the second reliability are based on a resiliency, accessibility, serviceability (RAS) standard.

3. The method according to claim 1, further comprising applying double device data correction (DDDC) to the first segment based on one of the first entry or the second entry.

4. The method according to claim 1, further comprising applying single device data correction (SDDC) to the first segment based on one of the first entry or the second entry.

5. The method according to claim 1, further comprising mirroring the first segment based on one of the first entry or the second entry.

6. The method according to claim 5, further comprising:
detecting a failure of a portion of the first segment; and
reconfiguring the first segment to stop the mirroring in response to the failure.

7. The method according to claim 6, wherein the first entry further comprises data representing a first performance associated with the first available configuration, the second entry further comprises data representing a second performance associated with the second available configuration, and the first performance is greater than the second performance, the method further comprising:
receiving, from a user via a user interface, an indication of a performance goal for an application;
allocating the first segment to the application according to the first available configuration based on the performance goal and the first performance; and
presenting an alert to the user indicating that the allocating of the first segment of the memory will take effect after the computer system is rebooted.

8. The method according to claim 1, wherein generating the data structure further comprises:
providing a third entry in the data structure corresponding to a third available configuration for a second segment of the memory other than the first segment, wherein the second segment is defined by a second starting address and a second length, and the third entry comprising data representing a third reliability associated with the third available configuration.

9. A computer system comprising:
a processor; and
a memory containing instructions thereon that, when executed by the processor, cause the processor to perform a set of actions comprising:
powering on the computer system;
in a pre-operating system environment of the computer system:
generating a data structure representing a plurality of available configurations for a first segment of the memory, wherein the first segment is defined by a first starting address and a first length, and generating the data structure comprises:
providing a first entry in the data structure corresponding to a first available configuration of the plurality of available configurations and comprising data representing a first reliability associated with the first available configuration and a first performance associated with the first available configuration; and
providing a second entry in the data structure corresponding to a second available configuration of the plurality of available configurations and comprising data representing a second reliability associated with the second available configuration and a second performance associated with the second available configuration, wherein the second reliability is greater than the first reliability and the second performance is less than the first performance; and
booting an operating system of the computer system, wherein the booting comprises communicating the data structure to the operating system.

10. The computer system of claim 9, wherein the first reliability and the second reliability are based on a resiliency, accessibility, serviceability (RAS) standard.

11. The computer system of claim 9, wherein the set of actions further comprises:
applying double device data correction (DDDC) to the first segment based on one of the first entry or the second entry.

12. The computer system of claim 9, wherein the set of actions further comprises:
applying single device data correction (SDDC) to the first segment based on one of the first entry or the second entry.

13. The computer system of claim 9, wherein the set of actions further comprises:
mirroring the first segment based on one of the first entry or the second entry.

14. The computer system of claim 9, wherein the instructions, when executed by the processor, further cause the processor to provide data of the first entry representing an allocation of the first segment set aside for resiliency for the first available configuration.

15. The computer system of claim 9, wherein the instructions, when executed by the processor, further cause the processor to provide data for the first entry representing a power consumption associated with the first available configuration.

16. A non-transitory computer readable storage medium comprising programming executable as machine instructions by a processor, wherein executing the programming causes the processor to:
in a pre-operating system environment of a computer system:
generate a data structure representing a plurality of available configurations for a segment of the memory, wherein the segment is defined by a first starting address and a first length, and generating the data structure comprises:
provide a first entry in the data structure corresponding to a first available configuration of the plurality of available configurations and comprising data representing a first reliability associated with the first available configuration; and
provide a second entry in the data structure corresponding to a second available configuration of the plurality of available configurations and comprising data representing a second reliability associated with the second available configuration, wherein the second reliability is greater than the first reliability;
boot an operating system of the computer system, wherein the booting comprises communicating the data structure to the operating system.

17. The non-transitory computer readable storage medium of claim 16, wherein the first reliability and the second reliability are based on a resiliency, accessibility, serviceability (RAS) standard.

18. The non-transitory computer readable storage medium of claim 16, wherein executing the programming further causes the processor to apply double device data correction (DDDC) to the segment based on one of the first entry or the second entry.

19. The non-transitory computer readable storage medium of claim 16, wherein executing the programming further causes the processor to apply single device data correction (SDDC) to the segment based on one of the first entry or the second entry.

20. The non-transitory computer readable storage medium of claim 16, wherein executing the programming further causes the processor to mirror the segment based on one of the first entry or the second entry.

21. The non-transitory computer readable storage medium of claim 20, wherein executing the programming further causes the processor to:
detect a failure of a portion of the segment; and
reconfigure the segment to stop the mirroring in response to the failure.

22. The non-transitory computer readable storage medium of claim 16, wherein the first entry further comprises data representing a first performance associated with the first available configuration, the second entry further comprises data representing a second performance associated with the second available configuration, the first performance is greater than the second performance, and executing the programming further causes the processor to:
receive, from a user via a user interface, an indication of a performance goal for an application; and
allocate the first segment to the application according to the first available configuration based on the performance goal and the first performance.

23. The non-transitory computer readable storage medium of claim 22, wherein executing the programming further causes the processor to:
present an alert to the user indicating that the allocating of the segment will take effect after the computer system is rebooted.

* * * * *